United States Patent
Kusuyama

(10) Patent No.: US 6,639,727 B2
(45) Date of Patent: Oct. 28, 2003

(54) OPTICAL LENS AND OPTICAL SYSTEM HAVING INCLINED COLUMNAR OPTICAL MEMBERS

(75) Inventor: Yutaka Kusuyama, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 10/141,415

(22) Filed: May 9, 2002

(65) Prior Publication Data

US 2002/0131178 A1 Sep. 19, 2002

Related U.S. Application Data

(63) Continuation-in-part of application No. PCT/JP00/07959, filed on Nov. 10, 2000.

(30) Foreign Application Priority Data

Nov. 10, 1999 (JP) .......................................... 11-319847

(51) Int. Cl.⁷ ............................................... G02B 27/10
(52) U.S. Cl. ........................................ 359/619; 359/621
(58) Field of Search ................................ 359/619, 621, 359/625, 626, 628, 641, 627

(56) References Cited

U.S. PATENT DOCUMENTS

| | | | |
|---|---|---|---|
| 4,678,311 A | | 7/1987 | Loce et al. ...................... 355/1 |
| 4,692,015 A | | 9/1987 | Loce et al. ...................... 355/1 |
| 4,852,982 A | * | 8/1989 | Yamamoto et al. ......... 359/652 |
| 4,986,939 A | | 1/1991 | Hoffmann ................... 264/1.7 |
| 5,004,328 A | | 4/1991 | Suzuki et al. ................ 350/416 |
| 5,513,201 A | | 4/1996 | Yamaguchi et al. .......... 372/75 |
| 6,031,668 A | * | 2/2000 | Toyama et al. .............. 359/654 |
| 6,429,977 B2 | * | 8/2002 | Kittaka ....................... 359/654 |
| 2002/0145705 A1 | * | 10/2002 | Toyama et al. ............... 353/30 |

FOREIGN PATENT DOCUMENTS

| | | | | |
|---|---|---|---|---|
| EP | 1 006 382 A1 | 6/2000 | | |
| JP | 57-181516 | 11/1982 | | |
| JP | 58-168026 | 10/1983 | | |
| JP | 63304201 A | * 12/1988 | ............ | G02B/3/00 |
| JP | 4-284401 | 10/1992 | | |
| JP | 05341141 A | * 12/1993 | ............ | G02B/6/04 |
| JP | 7-98402 | 4/1995 | | |
| JP | 9-96760 | 4/1997 | | |
| WO | WO 99/57791 | 11/1999 | | |

* cited by examiner

*Primary Examiner*—Ricky Mack
(74) *Attorney, Agent, or Firm*—Morgan, Lewis & Bockius LLP

(57) ABSTRACT

The optical lens pertaining to the present invention comprises two first optical member arrays in which a plurality of columnar optical members that act on the light incident from light emitting components are arrayed in a state of α° inclination, and a second optical member that is columnar in shape and made of a transparent material, and inside of which the two first optical member arrays are embedded in the columnar axial direction thereof, wherein the material of which the columnar optical members are made has a refractive index that is higher than that of the transparent material of the second optical member. Because the first optical member arrays are integrally embedded in the second optical member, they can be disposed all at once in their proper locations. Also, since the bumpy portions resulting from the curved surfaces of the columnar optical members are not exposed on the outside, no dust accumulates in these portions, which results in an optical lens with superior light emission performance. Furthermore, since the columnar optical members are inclined by α°, the incident light is emitted such that the light has been rotated by 2α° with the optical axis being the center axis.

20 Claims, 13 Drawing Sheets

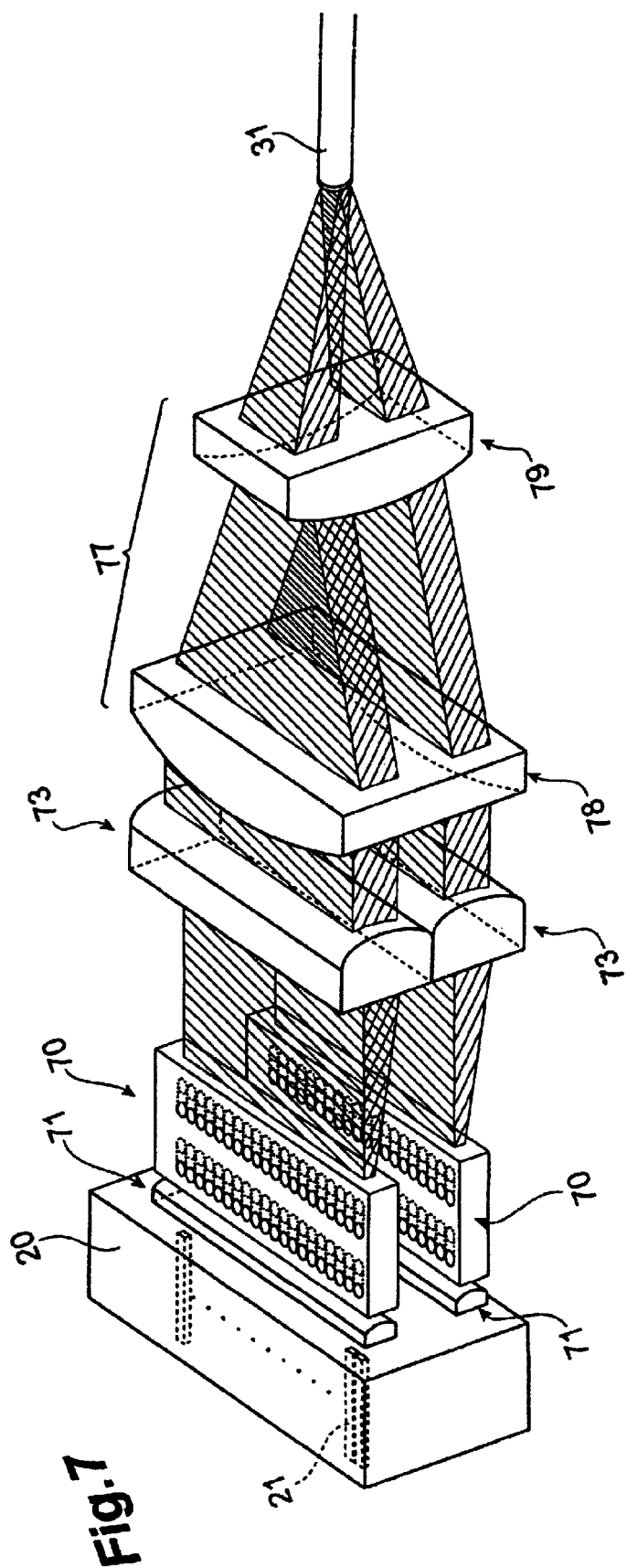

US 6,639,727 B2

OPTICAL LENS AND OPTICAL SYSTEM HAVING INCLINED COLUMNAR OPTICAL MEMBERS

RELATED APPLICATION

This is a continuation-in-part application of application Ser. No. PCT/JP00/07959 filed on Nov. 10, 2000, now pending.

BACKGROUND OF THE INVENTION

1. Field of the Invention

This invention relates to a an optical lens that acts on each beam of light emitted from a light emitting element comprising an array of a plurality of light emitting components, and more particularly relates to an optical lens with which each beam of light is collimated, converged, and changed their optical path.

2. Related Background Art

An optical lens collimates (makes parallel) the light emitted from a semiconductor laser element as a light emitting element, and focuses the light onto a microscopic spot on a light receiving component such as an optical fiber. The most common configuration for a semiconductor laser element is that of a semiconductor laser array in which a plurality of light emitting components are arranged in a row, in which case the optical lens is also in the form of an array in order to collimate each beam of the incident light from the light emitting components one by one. Japanese Laid-Open Patent Application H7-98402 discloses an optical path converter in which a plurality of cylindrical lenses are disposed in a row. International Laid-Open Patent Application WO99/57791 and European Laid-Open Patent Application EP1006382A1 disclose an optical lens for semiconductor laser optical lens in which a plurality of cylindrical lenses are formed integrally. The cylindrical lenses used in the above optical path converter and optical lenses individually collimate the beams of light emitted from the light emitting components of the semiconductor laser array.

However, the following problems were encountered with these conventional optical lenses.

(1) With the optical path converter disclosed in Japanese Laid-Open Patent Application H7-98402, it was exceedingly difficult to dispose the cylindrical lenses in the form of an array such that they corresponded in pairs with the light emitting components of the semiconductor laser element in order to collimate the beams of incident light.

(2) With the optical lenses disclosed in International Laid-Open Patent Application WO99/57791 and European Laid-Open Patent Application EP1006382A1, the problem in (1) above did not occur because the lens was formed integrally, but because the bumps and crevices resulting from the cylindrical lenses were exposed on the outside, dust tended to accumulate there, and this dust became a shadow which affected the light emission performance.

In view of this, it is an object of the present invention to provide an optical lens which can be simply disposed at the location where it can act on the light emitted from the light emitting components of the light emitting element in which a plurality of light emitting components are arranged.

It is a further object of the present invention to provide an optical lens in which the bumpy portions are not exposed and therefore do not gather dust.

SUMMARY OF THE INVENTION

In order to achieve the stated object, the present invention is an optical lens which acts on the beams of light emitted from a semiconductor laser element comprising an array of a plurality of light emitting components, and then emits the light, comprising two first optical member arrays having a plurality of columnar optical members including first optical action components in the side surface of the columnar optical member that have a curved surface on either the incident light side or the emitted light side and that act on the light emitted from the light emitting components, the columnar optical members being disposed in parallel and in the same plane, and a second optical member that is columnar in shape and made of a transparent material, and inside of which the two first optical member arrays are embedded in parallel in the columnar axial direction thereof, wherein the columnar axial direction of the columnar optical members is inclined by $\alpha°$ with respect to the direction in which the light emitting components are arranged in the semiconductor laser element, the material of which the columnar optical members are made has a refractive index that is different from that of the transparent material of the second optical member and each of the columnar optical members has two end portions both of which are exposed from the second optical member.

With this optical lens, because the first optical member arrays that act on the incident light from the light emitting element is integrally embedded in the second optical member, it is simple to dispose them at the locations where they can act on the beams of incident light.

Also, because the bumps and crevices resulting from the curved surfaces of the columnar optical members formed when the columnar optical members are arranged are covered by the second optical member and not exposed to the outside, dust will not accumulate in these portions.

Furthermore, strength is improved because the first optical member arrays are reinforced by the second optical member.

Also, since the columnar optical members are disposed at an angle of $\alpha°$, each beam of incident light is emitted such that the light has been rotated by $2\alpha°$ with the optical axis of the incident light being the center axis by the two first optical action components.

Furthermore, in case that the optical lens of the present invention is opposed to the semiconductor laser element, since the end portions of the columnar optical members are exposed, it is easy to position the first optical action components such that each of them is opposed to each of the light emitting components of the semiconductor laser element and possible to extend two end portions of each of the columnar optical members to the surfaces of the second optical member.

The phrase "act on light" as used herein means emitting incident divergent light after first reducing its divergence angle, or converting the optical path.

It is preferable if the material of which the columnar optical members are made has a coefficient of thermal expansion that is higher than that of the transparent material of the second optical member. It the optical lens is manufactured by covering a material with a high coefficient of thermal expansion with a material with a low coefficient, the resulting caulking effect will make the structure stronger and more resistant to cracking.

It is also preferable if the material of which the columnar optical members are made has a yield point that is higher than that of the transparent material of the second optical member. The difference in yield point can be utilized to manufacture an optical lens of the type in which embedding is achieved by drawing.

The second optical member may include a second optical action component that forms a curved surface on either the incident light side or the emitted light side of the second optical member, and acts in the Y-axial direction on the light emitted from the light emitting components. If so, the second optical member will be able to act in the Y-axial direction on either the light incident on the optical lens or the light emitted from the optical lens. "X-axial direction" herein refers to the direction in which the light emitting components are arranged in the light emitting element, while "Y-axial direction" refers to the direction perpendicular to the X-axial direction and the optical axis.

The present invention is also optical lenses arranged in two parallel rows, these optical lenses each being an optical lens which acts on the light emitted from a semiconductor laser element comprising an array of a plurality of light emitting components, and then emits the light, comprising a first optical member array having a plurality of columnar optical members including first optical action components in the side surface of the columnar optical member that have a curved surface on either the incident light side or the emitted light side and that act on the light emitted from the light emitting components, the columnar optical members being disposed in parallel and in the same plane, and a second optical member that is columnar in shape and made of a transparent material, and inside of which the first optical member array is embedded in the columnar axial direction thereof, wherein the columnar axial direction of the columnar optical members is inclined by $\alpha°$ with respect to the direction in which the light emitting components are arranged in the semiconductor laser element, and the material of which the columnar optical members are made has a refractive index that is different from that of the transparent material of the second optical member.

Because the optical lens is divided in two, its action on the incident light can be adjusted through positional adjustment.

The second optical member of the optical lens of either of the two rows of optical lenses arranged in parallel may include a second optical action component that forms a curved surface on either the incident light side or the emitted light side of the second optical member, and acts in the Y-axial direction on the light emitted from the light emitting components. If so, the second optical member will be able to act in the Y-axial direction on either the light incident on the optical lens or the light emitted from the optical lens.

The columnar optical members may be cylindrical optical members, for example. This results in more effective optical path conversion.

The columnar optical members may also be semi-cylindrical optical members, for example. This again results in more effective optical path conversion. "Semi-cylindrical" as used herein refers to a columnar shape, one side of which is a flat surface and the other side of which has a convex curved surface. The curved surface may be aspherical. A pair of another side surfaces each consisting of a flat surface may be further provided between the convex curved surface and the flat surface.

The present invention is also an optical lens which acts on the light emitted from a semiconductor laser element comprising an array of a plurality of light emitting components, and then emits the light, comprising a first optical member array having a plurality of columnar optical members including first optical action components in the side surface of the columnar optical member that have a curved surface on both the incident light side and the emitted light side and that act on the light emitted from the light emitting element, the columnar optical members being disposed in parallel and in the same plane, and a second optical member that is columnar in shape and made of a transparent material, and inside of which the first optical member array is embedded in the columnar axial direction thereof, wherein the columnar axial direction of the columnar optical members is inclined by $\alpha°$ with respect to the direction in which the light emitting components are arranged in the semiconductor laser element, and the material of which the columnar optical members are made has a refractive index that is different from that of the transparent material of the second optical member. Because curved surfaces are formed on the incident light and emitted light sides of the first optical action components of the columnar optical members, and the columnar optical members are disposed at an angle of $\alpha°$, each beam of the incident light is emitted such that the light has been rotated by $2\alpha°$ with the optical axis of the incident light being the center axis by one of the first optical member arrays.

The curved surface of the first optical action component may be a convex curved surface, and the material of which the columnar optical members are made may have a refractive index that is higher than that of the transparent material of the second optical member, The curved surface of the first optical action component may be a concave curved surface, and the material of which the columnar optical members are made may have a refractive index that is lower than that of the transparent material of the second optical member.

It is preferable if the columnar axial direction of the columnar optical members is inclined by 45° with respect to the direction in which the light emitting components are arranged in the semiconductor laser element. Because the columnar optical members are disposed at an angle of 45°, the incident light is emitted such that the light has been rotated by 90° with the optical axis of the incident light being the center axis by the two first optical action components, so the X-axial direction and the Y-axial direction are switched.

The present invention is also an optical lens comprising one of the above-mentioned optical lenses and a parallel optical lens that is disposed along with the above-mentioned optical lens and includes a third optical action component that acts in the Y-axial direction on the light emitted from the light emitting components. Because the parallel optical lens including the third optical action component is separately provided, disposition at the desired location is possible.

The present invention is also an optical system comprising a light emitting element consisting of an array of a plurality of light emitting components, one of the above-mentioned optical lenses that acts on the light emitted from the light emitting element, and a light receiver comprising one or an array of a plurality of light receiving components that receive the light emitted from the optical lens. This realizes an optical system comprising an optical lens whose disposition is simple and light emission performance is excellent, and which can emit the incident light such that it has been rotated by $2\alpha°$ with the optical axis of the incident light being the center axis.

The present invention is also an optical lens, which acts on the light emitted from a semiconductor laser element comprising an array of a plurality of light emitting components, and then emits the light, comprising two first optical members each having a plurality of columnar optical portions including first optical action components in the side surface of the columnar optical portion that have a curved surface on either the incident light side or the emitted light side and that act on the light emitted from the light emitting components, the columnar optical portions being disposed in parallel and in the same plane and a second optical member that is columnar in shape and made of a transparent material, and inside of which the two first optical members are embedded in parallel in the columnar axial direction thereof, wherein the columnar axial direction of the columnar optical portions is inclined by α° with respect to the direction in which the light emitting components are arrayed in the semiconductor laser element, the material of which the first optical members are made has a refractive index that is different from that of the transparent material of the second optical member, and each of the first optical members has two end portions both of which are exposed from the second optical member.

The present invention is also an optical lens comprising two first optical member arrays each having a plurality of columnar optical members including first optical action components in the side surface of the columnar optical member that have a curved surface that acts on the incident light, the columnar optical members being disposed along a predetermined direction and the extending directions of which being disposed in parallel each other, and a second optical member that is made of a transparent material and inside of which the two first optical member arrays are embedded in parallel, wherein the extending direction of the columnar optical members is inclined by α° with respect to the predetermined direction along which a plurality of the columnar optical members are disposed, the material of which the columnar optical members are made has a refractive index that is different from that of the transparent material of the second optical member, and each of the columnar optical members has two end portions both of which are exposed from the second optical member.

The present invention is also an optical lens comprising two first optical members each having a plurality of columnar optical portions including first optical action components in the side surface of the columnar optical portion that have a curved surface that acts on the incident light, the columnar optical portions being disposed along a predetermined direction and the extending directions of which being disposed in parallel each other, and a second optical member that is made of a transparent material and inside of which the two first optical members are embedded in parallel, wherein the extending direction of the columnar optical portions is inclined by α° with respect to the predetermined direction along which a plurality of the columnar optical portions are disposed, the material of which the first optical members are made has a refractive index that is different from that of the transparent material of the second optical member, and each of the first optical members has two end portions both of which are exposed from the second optical member.

BRIEF DESCRIPTION OF THE DRAWINGS

FIG. 7 is a simplified diagram illustrating the action of an optical system;

DESCRIPTION OF THE PREFERRED EMBODIMENTS

Figure 1A:
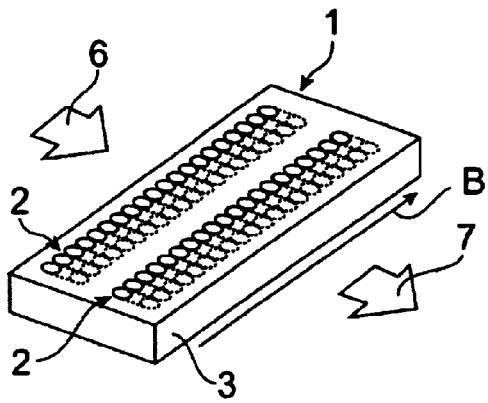
FIGS. 1A to 1D are overall diagrams of the optical lens pertaining to a first embodiment of the present invention.

Embodiments of the present invention will now be described in detail, through reference to the drawings. Those components that are the same or equivalent are labeled the sate in the following description, and redundant descriptions will be omitted.

FIGS. 1A to 1D are overall diagrams of the optical lens pertaining to a first embodiment of the present invention. FIG. 2 is a detail enlargement of the optical lens shown in FIG. 1A. Divergent light emitted from a semiconductor laser array as a light emitting element where a plurality of light emitting components are disposed in an array is incident on the optical lens 1 in FIG. 1A, and after the optical paths of the beams of light have been converted the light is directed for a light receiving component such as an optical fiber. Unless otherwise specified, the light incidence direction 6 and the light emission direction 7 in the optical lens described in the embodiments of the invention are the same as the directions shown in FIG. 1A. The optical lens 1 pertaining to this first embodiment comprises two rows of first optical member arrays 2 corresponding to the semiconductor laser array, and a second optical member 3 inside which the two rows of first optical member arrays 2 are embedded. The two rows of first optical member arrays 2 are disposed parallel to each other.

The first optical member arrays 2 comprise a plurality of columnar optical members 10 including first optical action components 11 in the side surface 14 of columnar optical member 10 that turn the axis of the beam cross section of incident light from the semiconductor laser array and convert the optical path. The plurality of columnar optical members 10 are disposed in a row, close together and with the columnar axes lined up in the same direction. In addition, these columnar optical members 10 are disposed such that their columnar axial direction is at a 45° angle to the direction in which the light emitting components are arranged in the semiconductor laser array, that is, to the axial direction of the first optical member arrays 2. The columnar optical members 10 are each cylindrical in form, and the first optical action components 11 are formed by cylindrical curved surfaces at the sides. Therefore, convex curved surfaces are formed on both the light incident side and the light emission side of the optical lens in this first embodiment. In addition to being cylindrical, the columnar optical members 10 may also be semi-cylindrical, wherein a curved surface is formed on either the light incident side or the light emission side, but not both. The second optical member 3 is formed in columnar shape from a transparent material, and two rows of the first optical member arrays 2 are embedded inside along the columnar axial direction thereof, Further, as shown in FIG. 2, each of the columnar optical members 10 has two end portions 13. Both of two end portions 13 are exposed from the second optical member 3. When optical lens 1 are opposed to the semiconductor laser element, since the end portions 13 of the columnar optical members 10 are exposed, it is easy to position the first optical action components 11 such that each of them is opposed to each of the light emitting components and possible to extend the two end portions 13 to the surfaces of the second optical member 3.

Because the optical lens 1 in the first embodiment has a form in which a plurality of the individual and separate columnar optical members 10 are covered by the second optical member 3, there is no need for the columnar optical members 10 to be disposed in an array corresponding to the light emitting components, and in this respect this lens functions the same as an integrally formed optical lens. Meanwhile, since the first optical member arrays 2 are embedded in the second optical member 3, the bumpy portions of the first optical action components 11 are not exposed to the outside. Consequently, dust does not accumulate in the bumpy portions and cause shadows, so the resulting optical lens 1 has excellent light emission performance. When the columnar optical members 10 are inclined at an angle of 45° with respect to the direction in which the light emitting components are arranged in the semiconductor laser array, the surface area of the bumpy portion is greater than when they are arranged vertically, and when used in this state (in which the columnar optical members 10 are maintained at a 45° angle, rather than being laid flat), there has been a problem in that dust is more apt to accumulate than when they are arranged in a vertical state, but with the optical lens 1 in this first embodiment, the first optical member arrays 2 having the bumpy surface is covered by the second optical member 3, which eliminates this problem. Moreover, the strength is better because the second optical member 3 reinforces the arrays, facilitating handling.

A material whose refractive index is higher than that of the glass transparent material of the second optical member 3 (such as BK7 made by Schott; refractive index 1.52, coefficient of thermal expansion $71 \times 10^{-7}$/K, yield point 614° C.) is used for the glass material (such as LaSFn14 made by Sumita Optical Glass; refractive index 1.83, coefficient of thermal expansion $82 \times 10^{-7}$/K, yield point 689° C.) of the columnar optical members 10 of the first optical member arrays 2. Thus providing a refractive index differential allows the first optical action components 11 of the columnar optical members 10 to function more efficiently and because a material with a refractive index higher than that of the transparent material of the second optical member 3 is used for the material that makes up the columnar optical members 10, the light emitted from the semiconductor laser array undergoes optical path conversion due to the convex curved surfaces of the first optical action components 11, respectively. (Incidentally, when a material with a refractive index lower than that of the transparent material of the second optical member 3 is used for the material that makes up the columnar optical members 10, the light emitted from the semiconductor laser array will undergo optical path conversion if concave curved surfaces are formed as the first optical action components 11.) As disclosed in Japanese Laid-Open Patent Applications H7-287104 and H7-98402, it is also possible to form a lens with a different refractive index differential by utilizing ion exchange on the outer surface of the same optical lens, but in this case an adequate refractive index differential cannot be provided between the portions that have and have not undergone ion exchange, and it is impossible to accurately form the curved surface shape, which affects the characteristics of the lens. This problem is solved in this embodiment because the optical lens is made up of different optical materials.

Also, a material with a coefficient of thermal expansion higher than that of the transparent material of the second optical member 3 is used for the material that makes up the columnar optical members 10. If the lens is manufactured by covering a material having a high coefficient of thermal expansion with a material having a low coefficient, the resulting caulking effect will make the structure stronger and more resistant to cracking throughout the heating and drawing process and the cooling process.

Also, because the columnar optical members 10 are disposed at a 45 degree angle, the incident light is emitted such that the light has been rotated by 90° with its optical axis being the center (optical path conversion) through the action of the first row of columnar optical members 10a and the second tow of columnar optical members 10b. This action will be described in detail below.

Figure 1B:
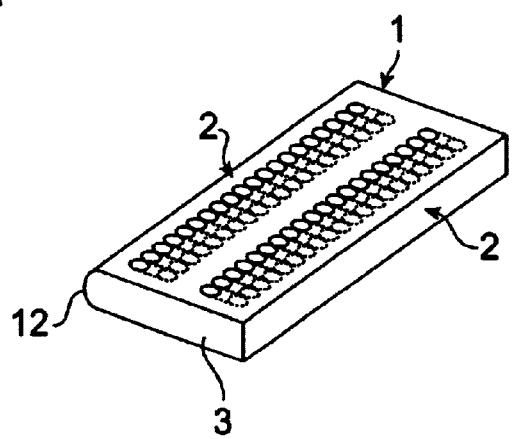
Figure 1C:
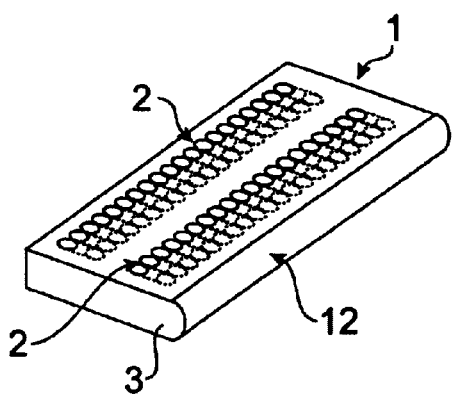
Figure 1D:
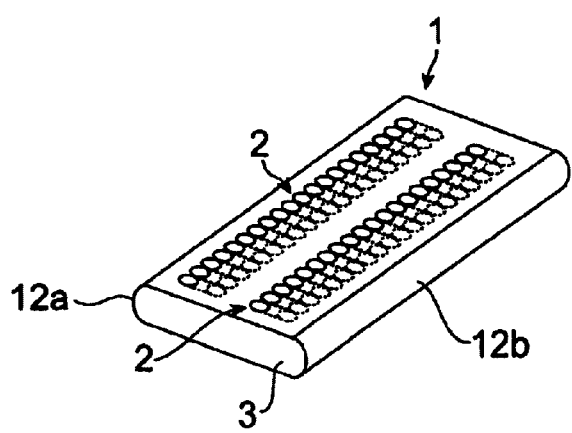
Figure 2:
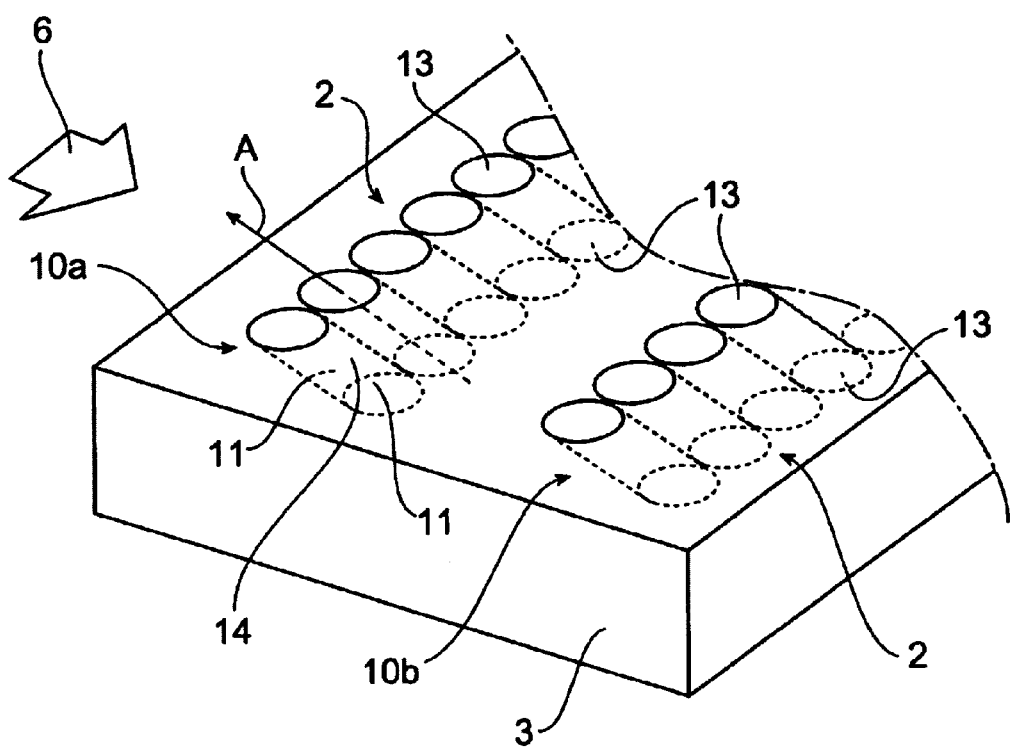
FIG. 2 is a detail enlargement of the optical lens shown in FIG. 1A.

As another example of the first embodiment, as shown in FIG. 1B, the second optical member 3 may include a second optical action component 12 that forms a convex curved surface on the incident light side and collimates the incident light in the Y-axial direction. Also, as shown in FIG. 1C, the second optical member 3 may include a second optical action component 12 that forms a convex curved surface on the emitted light side and collimates the incident light in the Y-axial direction. Because the light incident on this second optical action component 12 has been rotated by 90° with the optical axis being the rotational axis by the two rows of columnar optical members 10a and 10b, the light component in the Y-axial direction collimated by the second optical action component 12 could have diverged in the X-axial direction at the point when it is emitted from the semiconductor laser 21 (thus, the same can be said for all of the optical action components provided to the rear of the columnar optical members 10 arranged in two rows). Furthermore, as shown in FIG. 1D, the second optical member 3 may include a second optical action component 12 that forms a convex curved surface on the incident light side and the emitted light side and collimates the incident light and emitted light in the Y-axial direction.

Figure 3:
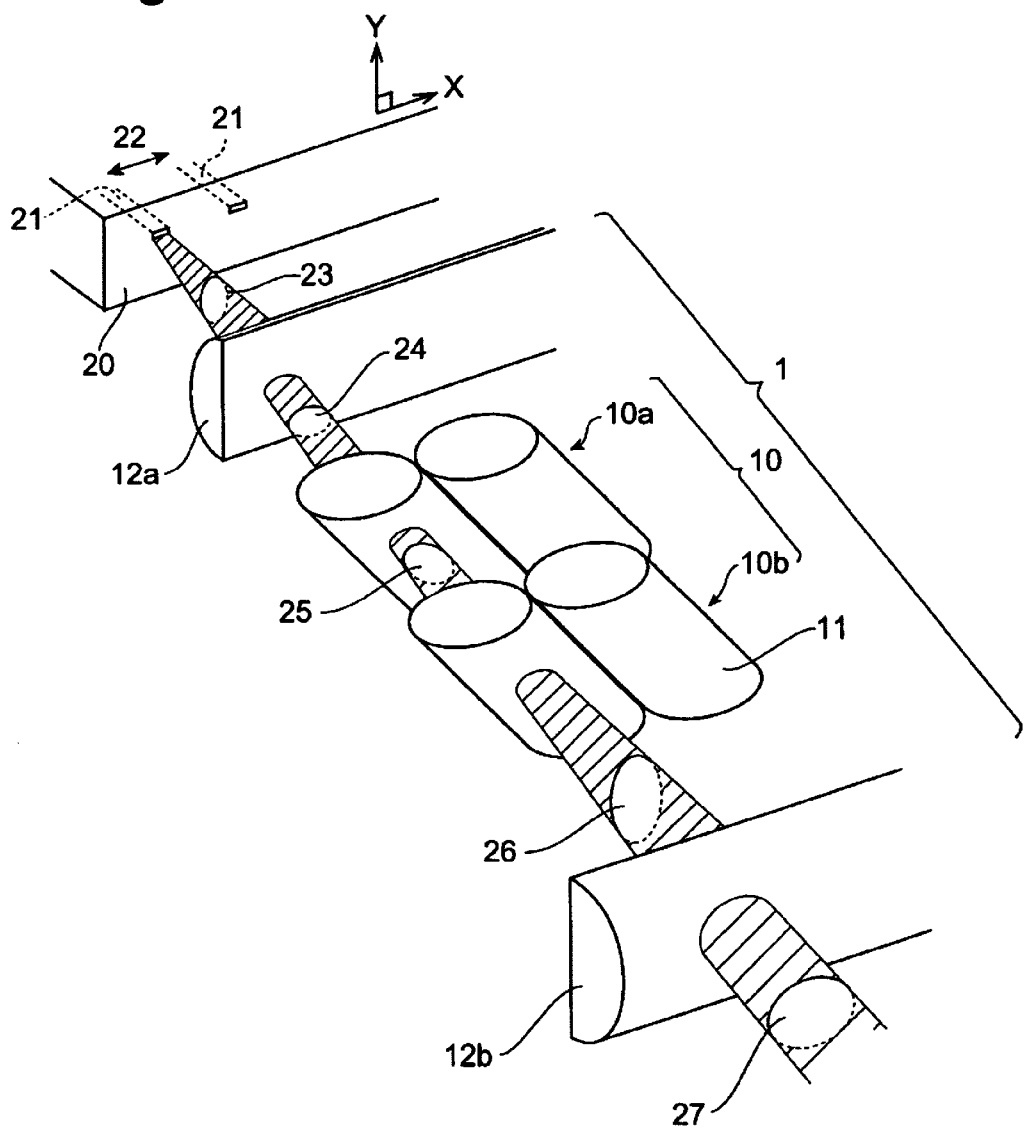
FIG. 3 is a simplified diagram illustrating the action of an optical system.

FIGS. 3 to 7 are simplified diagrams illustrating the action of optical systems. The optical system shown in FIG. 3 is the basic configuration, comprising a semiconductor laser array 20 and the optical lens 1. The semiconductor laser array 20 (light emitting element array) comprises an array of a plurality of light emitting components 21 (active layer stripes). These light emitting components 21 are structured such that the width of the stripe is greater than its thickness, and have an output of about 1 W. The pitch width 22 is 800 $\mu$m, the stripe width is 200 $\mu$m, the width of the active layer (the X-axial direction parallel to the active layer) is great (100 to 200 $\mu$m), and the thickness of the active layer (the Y-axial direction perpendicular to the active layer) is small (0.1 to 1 $\mu$m). If we assume that there are 12 active layer stripes, then the total length thereof is less than about 10 mm. The optical lens 1 corresponds to the one shown in FIG. 1D. An optical fiber 31 may be arranged as the light receiving component of the optical system. For the sake of simplicity, FIG. 3 only shows the portion of the optical lens 1 having optical action components that act on either incident light or emitted light.

The light emitted from the light emitting components 21 and incident on the optical lens 1 is divergent light, and has an elliptical optical cross section 23 that is longer in the Y-axial direction. Specifically, the divergence angle of the light emitted from the light emitting components 21 is greater (50 to 60°) for the component perpendicular to the active layer (the Y-axial direction component) and smaller (not more than 10°) for the parallel component (the X-axial direction component). This incident light is collimated in the Y-axial direction by the second optical action component 12a on the incident light side, which yields the optical cross section 24. At this point, the light emitted from the second optical action component 12a on the incident light side is collimated in the Y-axial direction, so there is no divergence in the Y-axial direction, but there is divergence in the X-axial direction. Next, the axis of the best cross section of the incident light is turned by 45° each by the two columnar optical members 10a and 10b, resulting in a total optical path conversion or 90°. Specifically, the light diverging in the X-axial direction emitted from the light emitting components 21 is switched to the Y-axial direction, and the light that has already been collimated in the Y-axial direction is switched to the X-axial direction, which yields first the optical cross section 25 and then the optical cross section 26. This light is then collimated in the Y-axial direction by the second optical action component 12b on the emitted light side, and as a result, the emitted light has the optical cross section 27 that is collimated in both the X-axial direction and the Y-axial direction. Thus switching the X-axial direction and Y-axial direction of light that has already been collimated in the Y-axial direction yields light that is collimated in the X-axial direction and divergent in the Y-axial direction. The advantage to this is that it prevents the incident light beams from the light emitting components 21 arranged in the X-axial direction from overlapping each other, and also facilitates incidence on a condenser lens discussed below.

Japanese Laid-Open Patent Application H7-98402 and European Laid-Open Patent Application EP1006382A1 disclose an optical lens in which arrays of columnar lenses inclined at 45° are arranged in two parallel rows. However, the optical lens discussed in Japanese Laid-Open Patent Application H7-98402 is not an integrated type, which makes disposition with respect to the light emitting components difficult, and the optical lens discussed in European Laid-Open Patent Application EP1006382A1 has the lens portion exposed, so dust tends to accumulate and light emission performance suffers. In this respect, the above prior art does not have the same effect as the optical lens discussed in this embodiment.

Figure 4:
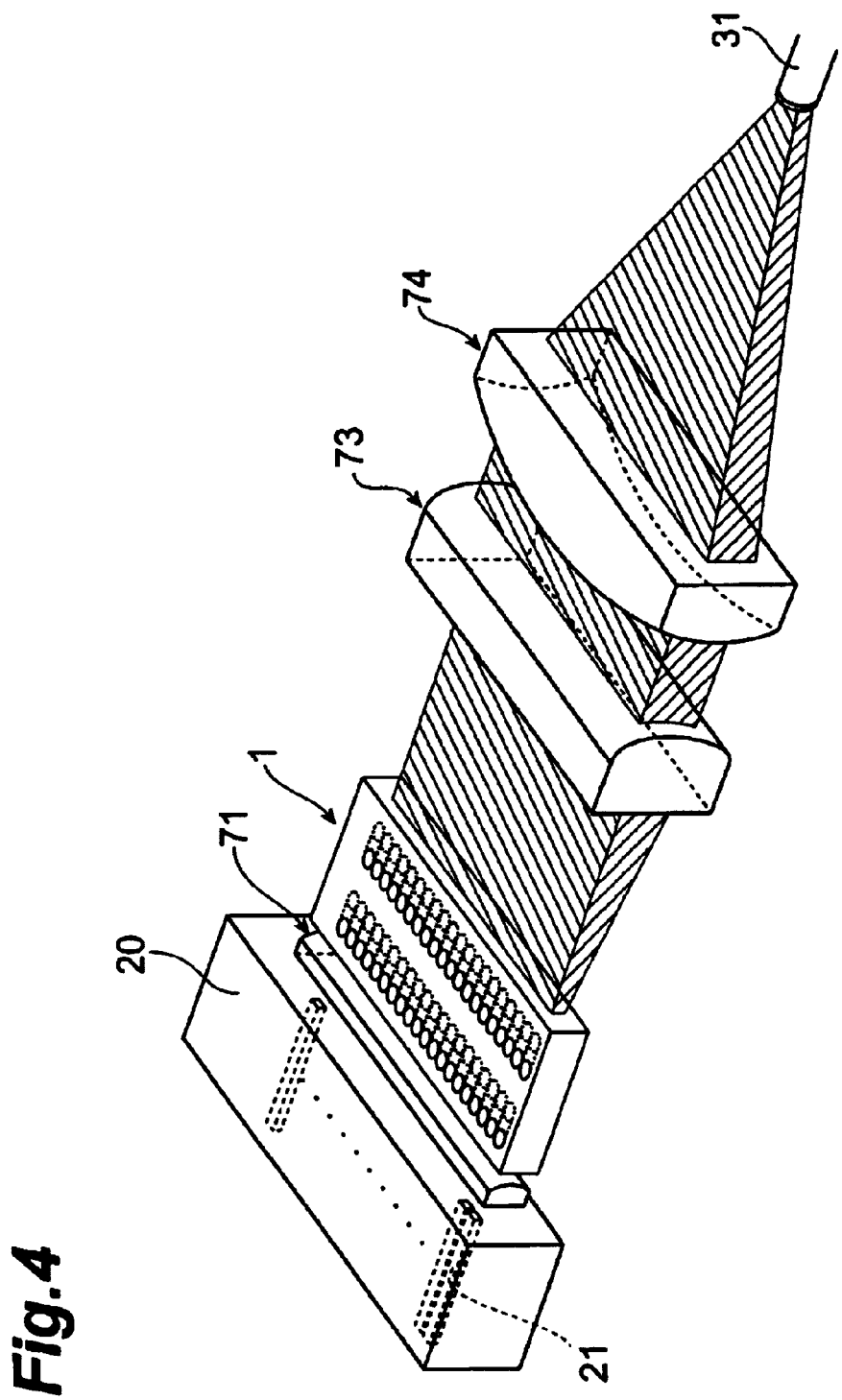
FIG. 4 is a simplified diagram illustrating the action of an optical system.
Figure 5:
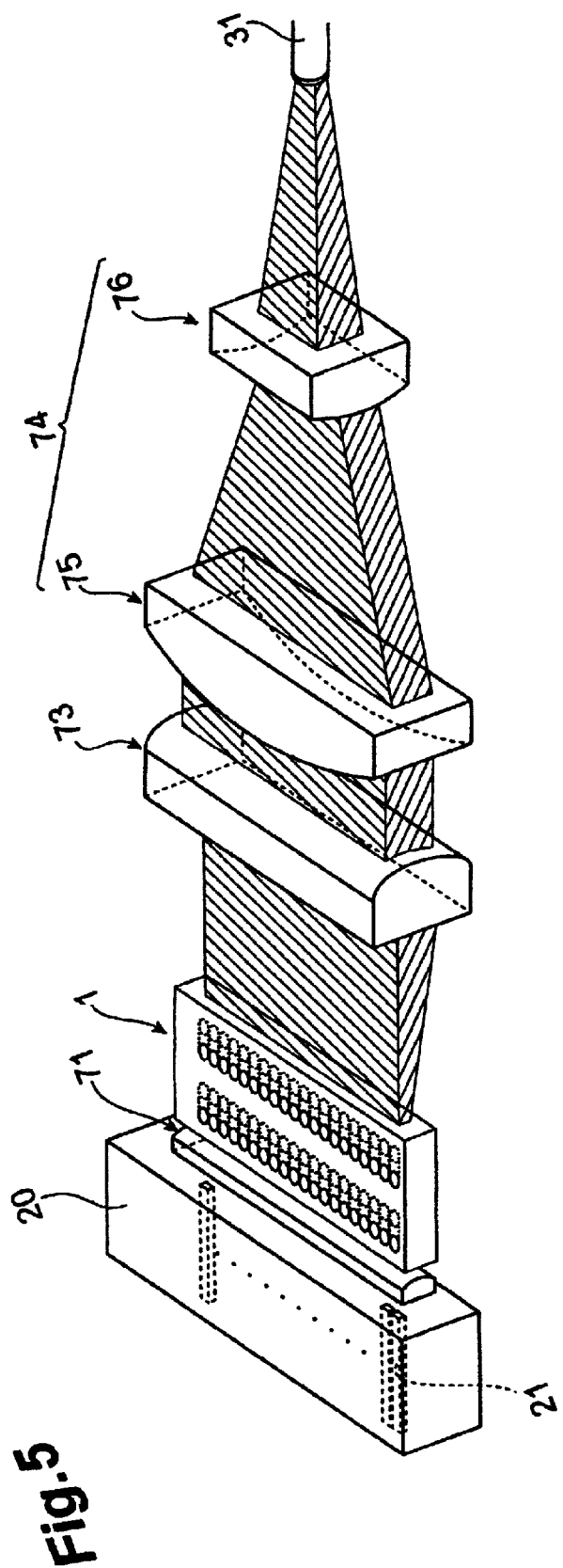
FIG. 5 is a simplified diagram illustrating the action of an optical system.

The optical systems shown in FIGS. 4 and 5 are applied types, and include a semiconductor laser array 20, a parallel optical lens 71, an optical lens 1, a second parallel optical lens 73, a condenser lens 74, and an optical fiber 31. The semiconductor laser array 20 (light emitting element array) comprises an array of a plurality of light emitting components 21. The optical lens 1 corresponds to the one shown in FIG. 1A. An optical fiber 31 may be arranged as the light receiving component of the optical system.

The incident light (divergent light) from the light emitting components 21 is collimated in the Y-axial direction by the parallel optical lens 71. Next, the X-axial direction and the Y-axial direction are switched by the optical lens 1. Therefore, the light emitted from the optical lens 1 is collimated in the X-axial direction and divergent in the Y-axial direction. After this, the light is collimated in the Y-axial direction by the second parallel optical lens 73, and light that is collimated in both the X-axial direction and the Y-axial direction is emitted from the second parallel optical lens 73. This light is further condensed by the condenser lens 74 and received by the optical fiber 31. The condenser lens 74 shown in FIG. 4 simultaneously condenses in the X-axial direction and Y axial direction. The condenser lens 74 shown in FIG. 5 comprises an X-axial direction condenser lens 75 and a Y-axial direction condenser lens 76. The condenser lens shown in FIG. 5 is divided in two, which makes possible a design such that the X-axial direction angle and Y-axial direction angle of the light received by the optical fiber 31 are either the same or very close. Doing this is effective when the obtained light is to be received in a very small area. Also, when the obtained light is used as an excitation light source for a solid laser device, this allows for more efficient excitation.

Figure 6:
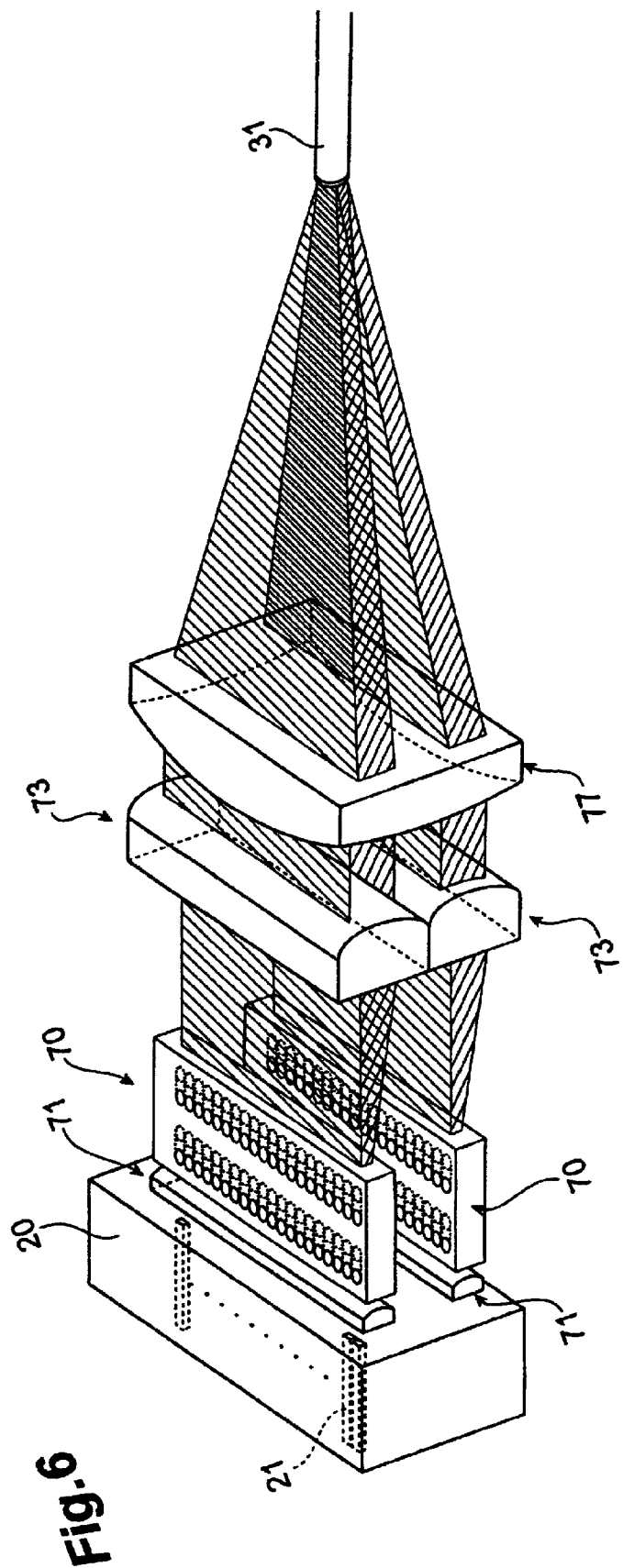
FIG. 6 is a simplified diagram illustrating the action of an optical system.

The optical systems shown in FIGS. 6 and 7 are other applied types, and correspond to semiconductor laser arrays 20 stacked in two tiers. The parallel optical lens 71, optical lens 1, and second parallel optical lens 73 are each stacked in two tiers. A condenser lens 77 condenses all the light from the two tiers into the optical fiber 31. The action that the optical system has on the light is the same as that of the optical system shown in FIGS. 4 and 5. The condenser lens 77 shown in FIG. 6 simultaneously condenses in the X-axial direction and Y-axial direction. The condenser lens 77 shown in FIG. 7 comprises an X-axial direction condenser lens 78 and a Y-axial direction condenser lens 79. Just as with the condenser lens shown in FIG. 5, the condenser lens shown in FIG. 7 makes possible a design such that the X-axial direction angle and Y-axial direction angle of the light received by the optical fiber 31 are either the same or very close. Doing this is effective when the obtained light is to be received in a very small area. Also, when the obtained light is used as an excitation light source for a solid laser device or the like, this allows for more efficient excitation.

In the above optical systems shown in FIGS. 3 to 7, the optical fiber 31 was depicted as the light receiving component, but a solid crystal for a solid laser device with LD excitation or collimator lens (having a concave curved surface) may also be used as the light receiving component. When a solid laser device is used, a coherent output light beam is created by the semiconductor substance excited by the light emitted from the condenser lens 74. When a collimator lens is used, possible applications include a parallel light emitter used in optical telecommunications.

Figure 8A:
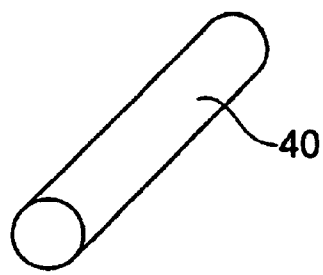
FIGS. 8A to 8C are simplified diagrams illustrating the steps involved in the production of an optical lens by drawing.
Figure 8B:
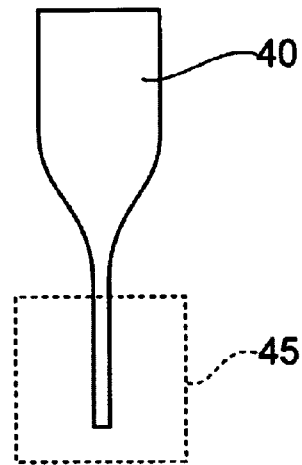
Figure 8C:
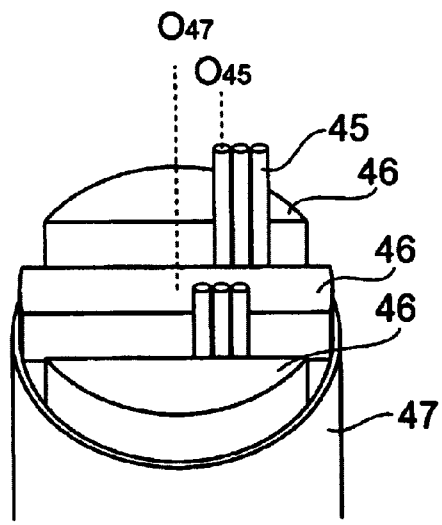

FIGS. 8A to 8C and FIGS. 9A to 9C are simplified diagrams illustrating the steps involved in the production of an optical lens by drawing. First, as shown in FIG. 8A, a base material (hereinafter referred to as the "core 40") composed of the material that makes up the first optical member arrays 2 is worked into cylindrical form. The curved surface of this cylindrical shape serves directly as the first optical action component of the produced optical lens. Thus, a characteristic in a method for producing an optical lens by drawing is that the shape at the core 40 stage directly becomes the shape of the optical lens. Next, as shown in FIG. 8B, this worked core 40 is heated and melted in an electric furnace or the like and subjected to a first drawing process to the desired size. The portion that has undergone the first drawing to the desired thickness (hereinafter referred to as the "core 45") is then cut. The core 45 that has undergone the first drawing has the same cross sectional shape as the core 40. Then, as shown in FIG. 8C, a number of cores 45 equal to the number of columnar optical members to be used are arranged in two parallel rows in the center inside a cylindrical tube 47 formed from the material that makes up the second optical member 3. Here, the center axis $O_{47}$ of the cylindrical tube 47 is adjusted to be parallel to the center axes $O_{45}$ of the plurality of cores 45. In order to fix the positions of the arranged plurality of cores 45, three spacers 46 formed from the material that makes up the second optical member 3 are inserted into the space inside the cylindrical tube 47 so as to sandwich the cores 45.

Figure 9A:
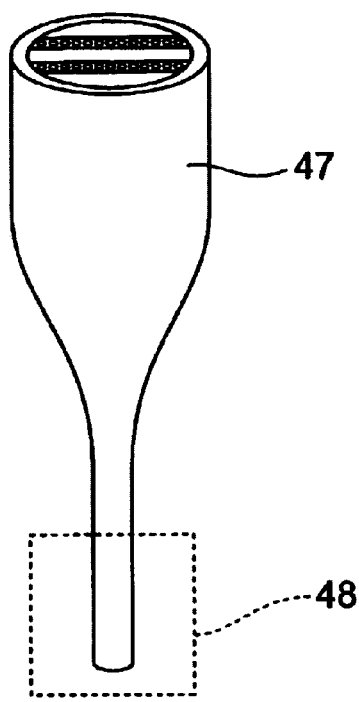
FIGS. 9A to 9C are simplified diagrams illustrating the steps involved in the production of an optical lens by drawing.
Figure 9B:
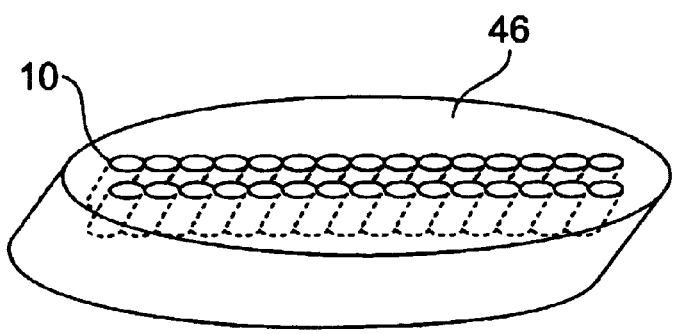
Figure 9C:
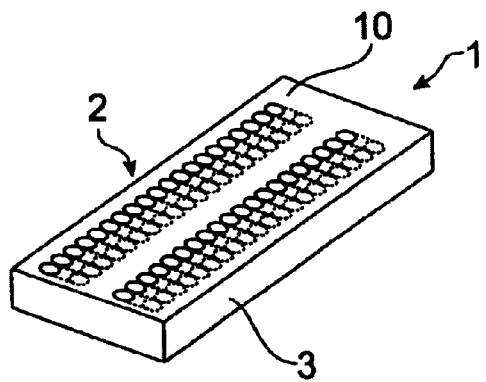
Figure 10A:
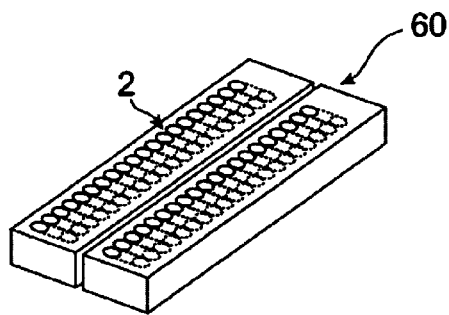
FIGS. 10A to 10D are overall diagrams of the optical lens pertaining to a second embodiment of the present invention.
Figure 10B:
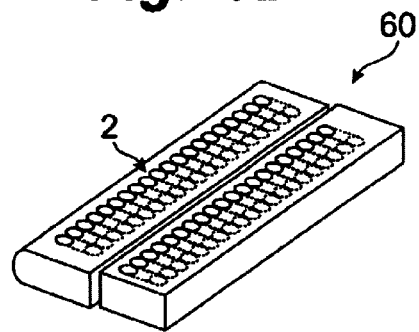
Figure 10C:
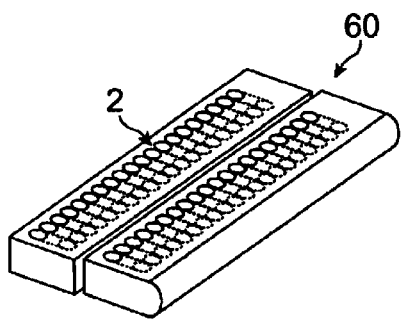
Figure 10D:
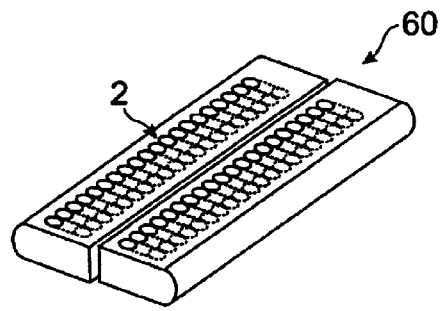
Figure 11A:
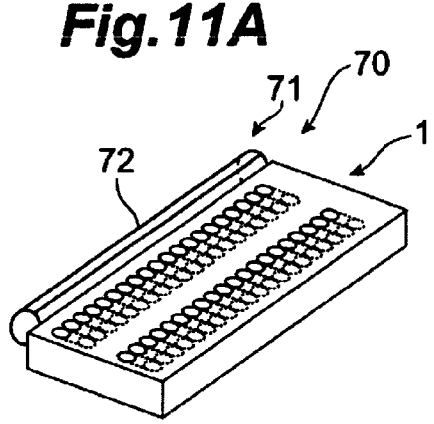
FIGS. 11A to 11E are overall diagrams of the optical lens pertaining to a third embodiment of the present invention.
Figure 11B:
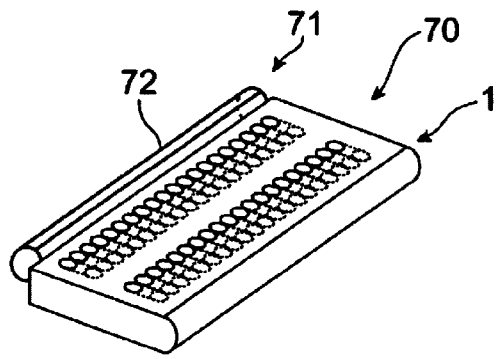
Figure 11C:
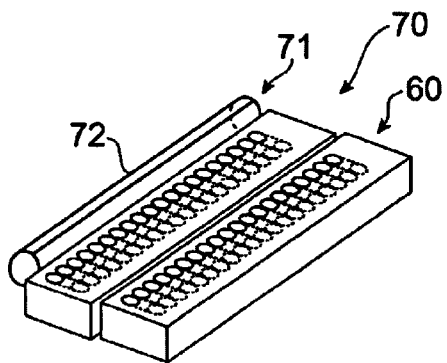
Figure 11D:
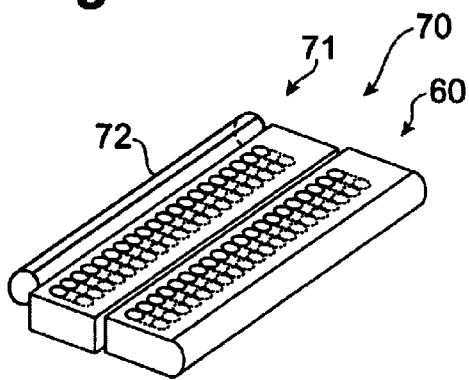
Figure 11E:
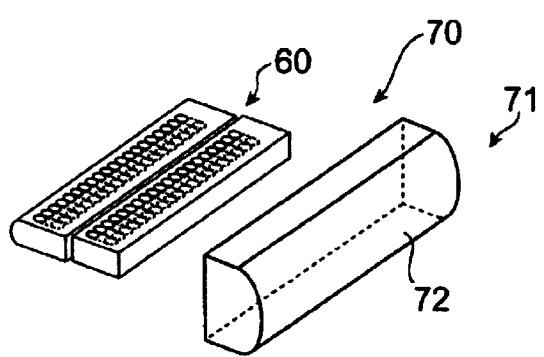

Next, as shown in FIG. 9A, this cylindrical tube 47 is subjected to a second drawing down to the outside diameter that is ultimately desired. The pitch width of the cores 45 here is matched to the pitch width of the plurality of light sources laid out in the form of an array. For instance, when the semiconductor laser array 20 is used as the light source as shown in FIG. 3, the above-mentioned matching is made to the pitch width 22 of the light emitting components 21. Because the columnar optical members 10 are disposed at an angle, this must be taken into account in determining the pitch width. Next, the rod portion 48 shown in FIG. 9A resulting from the second drawing of the cylindrical tube 47 is sliced. With the optical lens 1 in the first embodiment, it is possible to obtain the columnar optical members 10 that are inclined at 45° as shown in FIG. 9B by slicing the rod portion 48 that has undergone the second drawing at a 45° angle with respect to the axial direction of the rod portion 48. Then, as shown in FIG. 9C, the extra portion of the spacers 46 is sliced off, and the outer periphery where the spacers 46 have been removed is polished, which forms the optical lens 1 or the desired size. It is also possible to form a second optical action component by polishing the spacer 46 portion in this final step.

FIGS. 10A to 10D are overall diagrams of the optical lens pertaining to a second embodiment of the present invention. With the optical lens 1 in the first embodiment, two rows of the first optical member arrays 2 were embedded in a single optical lens 1, but with the optical lens 60 in this second embodiment, only one row of the first optical member array 2 is embedded, and two rows of optical lenses in which one row of the first optical member array 2 is embedded are arranged in parallel. This has the same action and effect as the first embodiment, while allowing the distance between the two rows of first optical member arrays 2 to be adjusted, so that the action on the incident light can be adjusted. If we consider the above-mentioned corresponding relationship, we see that the optical lenses 60 shown in FIGS. 10A, 10B, 10C, and 10D correspond to the optical lenses shown in FIGS. 1A, 1B, 1C, and 1D, respectively.

FIGS. 11A to 11E are overall diagrams of the optical lens pertaining to a third embodiment. In the optical lens 70 pertaining to this third embodiment, a parallel optical lens 71 that includes a third optical action component 72 for collimating in the Y-axial direction is provided. Because it is provided separately, it can be disposed freely in any location desired. The optical lens 70 shown in FIG. 11A comprises the optical lens 1 shown in FIG. 1A and the parallel optical lens 71, which is provided on the incident light side of this optical lens 1. The optical lens 70 shown in FIG. 11B comprises the optical lens 1 shown in FIG. 1C and the parallel optical lens 71, which is provided on the emitted light side of this optical lens 1. The optical lens 70 shown in FIG. 11C comprises the optical lens 60 shown in FIG. 10A and the parallel optical lens 71, which is provided on the incident light side of this optical lens 1. The optical lens 70 shown in FIG. 11D comprises the optical lens 60 shown in FIG. 10C and the parallel optical lens 71, which is provided on the incident light side of this optical lens 60. The optical lens 70 shown in FIG. 11E comprises the optical lens 60 shown in FIG. 10B and the parallel optical lens 71, which is provided on the emitted light side of this optical lens 60.

Figure 12A:
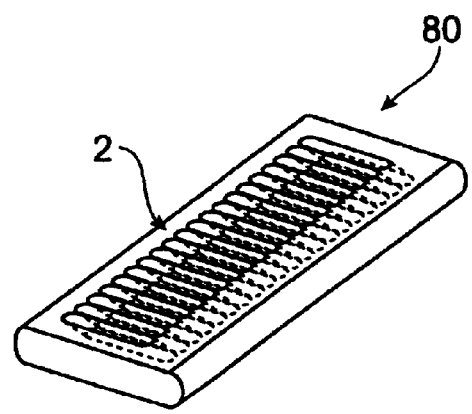
FIG. 12A is an overall diagram of the optical lens pertaining to a fourth embodiment.
Figure 12B:
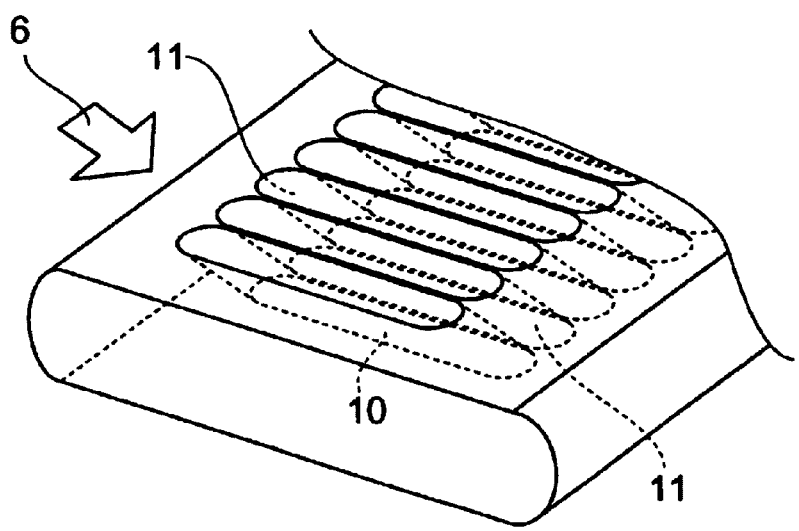
FIG. 12B is a detail enlargement of the optical lens shown in FIG. 12A.

FIG. 12A is an overall diagram of the optical lens pertaining to a fourth embodiment. FIG. 12B is a detail enlargement of the optical lens shown in FIG. 12A. The first optical member array 2 of the optical lens 80 pertaining to the fourth embodiment is formed by arranging in a row a plurality of columnar optical members 10 (see FIG. 12B) that include first optical action components 11 that have curved surfaces on the incident light and emitted light side and collimate the incident light. Because only half as many columnar optical members 10 are needed as with the optical lenses pertaining to the first to third embodiments, the manufacturing process is streamlined. With the optical lens 80 shown in FIG. 12A, the second optical action component 12 is formed on the incident light and emitted light side, but may instead be formed only on the incident light side or the emitted light side, or on neither side. In all other respects, the same action and effect are obtained as with the optical lenses pertaining to the first to third embodiments.

As described above, with the optical lenses pertaining to the various embodiments of the present invention, first optical member arrays that act on incident light from a light emitting element are integrally embedded in a second optical member, and therefore the optical lens can be simply disposed at the location where it can act on the beams of incident light, and the manufacturing process can be simplified.

Also, because the bumps and crevices resulting from the curved surfaces of the columnar optical members formed when the columnar optical members are arranged are covered by the second optical member and not exposed to the outside, dust will not accumulate in these portions. This prevents shadows and so forth from occurring in the emitted light, so the resulting optical lens has superior emission performance.

Furthermore, strength is improved because the first optical member arrays are reinforced by the second optical member, so the resulting optical lens also has excellent strength.

Also, since the columnar optical members are disposed at an angle of 45°, each beam of the incident light is emitted such that the light has been rotated by 90° with its optical axis being the center axis by the two first optical member arrays. This makes it possible for the light to be emitted with its direction switched between the X and Y axes.

The present invention was described in detail through the first to fourth embodiments, but the present invention is not limited to the above embodiments, which merely illustrate the best modes for carrying out the present invention, and various changes to the invention are encompassed by the Claims of the present invention, allowing modifications in shape, size, layout, structure, and so on.

For example, the action on the light was described mainly for a case in which incident light from the semiconductor laser array 20 was collimated and emitted to an optical fiber 30, but the light may be condensed instead of collimated.

Figure 13A:
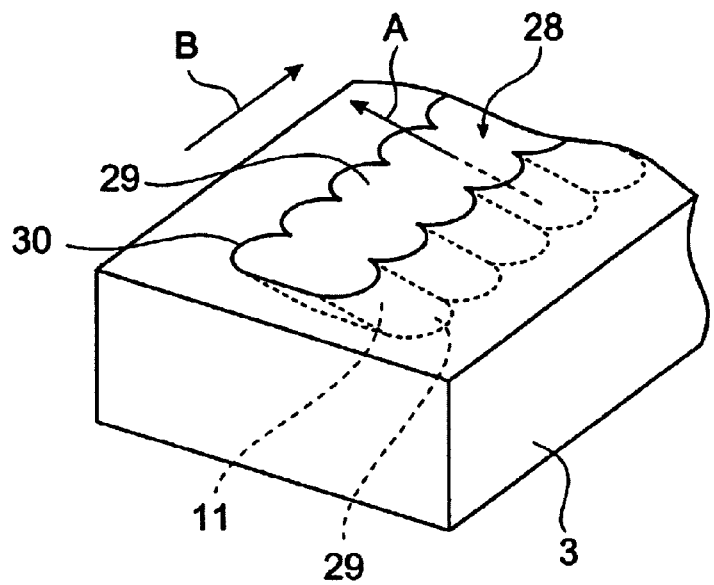
FIG. 13A is a diagram of an optical lens having a first optical member in place of two first optical member arrays.

Although, in optical lens 1 of the above first embodiment, two first optical member arrays 2 each having a plurality of columnar optical members 10 are embedded in second optical member 3, in the optical lens of the present invention, as shown in FIG. 13A, a first optical member 28 having a plurality of columnar optical portions may be used in place of two first optical member array 2 of optical lens 1. Each of the columnar optical portions 30 includes two first optical action components 11 in the side surface of the columnar optical portion. First optical member 28 has two end portions 29, and both of two end portions 29 are exposed from second optical member 3. Also, Columnar optical portions 30 are disposed along the predetermined direction B such that the extending directions A of columnar optical portions 30 are parallel each other. Here, extending direction A of columnar optical portion 30 are inclined by α° with respect to predetermined direction B.

Figure 13B:
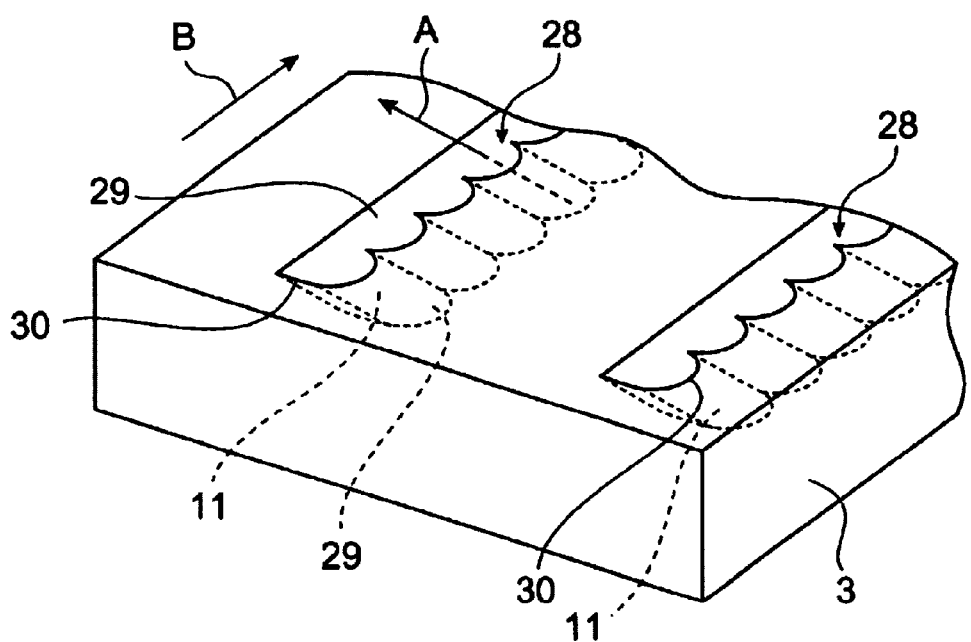
FIG. 13B is a diagram of an optical lens having two first optical members in place of two first optical member arrays.

Also, in the optical lens of the present invention, as shown in FIG. 13B, two first optical members 28 each having a plurality of columnar optical portions may be used in place of two first optical member arrays 2 of optical lens 1. Each of the columnar optical portions 30 includes first optical action component 11 in the side surface. First optical member 28 has two end portions 29, and both of two end portions 29 are exposed from second optical member 3. Also, Columnar optical portions 30 are disposed along the predetermined direction B such that the extending directions A of columnar optical portions 30 are parallel each other. Here, extending direction A of columnar optical portion 30 are inclined by α° with respect to predetermined direction B.

As above, the optical lens pertaining to the present invention is favorable for acting on the beams of light emitted from the light emitting components of a light emitting element in which a plurality of light emitting components are arranged, and particularly to collimation, condensing, and optical path conversion.

What is claimed is:

1. An optical lens, which acts on the light emitted from a semiconductor laser element comprising an array of a plurality of light emitting components, and then emits the light, comprising:

two first optical member arrays each having a plurality of columnar optical members including first optical action components in the side surface of the columnar optical member that have a curved surface on either the incident light side or the emitted light side and that act on the light emitted from the light emitting components, the columnar optical members being disposed in parallel and in the same plane; and a second optical member that is columnar in shape and made of a transparent material, and inside of which the two first optical member arrays are embedded in parallel in the columnar axial direction thereof, wherein the columnar axial direction of the columnar optical members is inclined by α° with respect to the direction in which the light emitting components are arrayed in the semiconductor laser element, the material of which the columnar optical members are made has a refractive index that is different from that of the transparent material of the second optical member, and each of he columnar optical members has two end portions both of which are exposed from the second optical member.

2. The optical lens according to claim 1, wherein the material of which the columnar optical members are made has a coefficient of thermal expansion that is higher than that of the transparent material of the second optical member.

3. The optical lens according to claim 1, wherein the material of which the columnar optical members are made has a yield point that is higher than that of the transparent material of the second optical member.

4. The optical lens according to claim 1, wherein the second optical member includes a second optical action component that forms a curved surface on either the incident light side or the emitted light side of the second optical member, and acts in the Y-axial direction on the light emitted from the light emitting components.

5. Optical lenses arranged in two parallel rows, said optical lenses each being an optical lens which acts on the light emitted from a semiconductor laser element comprising an array of a plurality of light emitting components, and then emits the light, comprising:

a first optical member array having a plurality of columnar optical members including first optical action components in the side surface of the columnar optical member that have a curved surface on either the incident light side or the emitted light side and that act on the light emitted from the light emitting components, the columnar optical members being disposed in parallel and in the same plane; and a second optical member that is columnar in shape and made of a transparent material, and inside of which the first optical member array is embedded in the columnar axial direction thereof, wherein the columnar axial direction of the columnar optical members is inclined by α° with respect to the direction in which the light emitting components are arrayed in the semiconductor laser element, and the material of which the columnar optical members are made has a refractive index that is different from that of the transparent material of the second optical member.

6. The optical lens according to claim 5, wherein the second optical member of the optical lens of either of the two rows of optical lenses arranged in parallel includes a second optical action component that forms a curved surface on either the incident light side or the emitted light side of the second optical member, and acts in the Y-axial direction on the light emitted from the light emitting components.

7. The optical lens according to claim 1, wherein the columnar optical members are cylindrical optical members.

8. The optical lens according to claim 1, wherein the columnar optical members are semi-cylindrical columnar optical members.

9. An optical lens, which acts on the light emitted from a semiconductor laser element comprising an array of a plurality of light emitting components, and then emits the light, comprising:

a first optical member array having a plurality of columnar optical members including first optical action components in the side surface of the columnar optical member that have a curved surface on both the incident light side and the emitted light side and that act on the light emitted from the light emitting components, the columnar optical members being disposed in parallel and in the same plane; and a second optical member that is columnar in shape and made of a transparent material, and inside of which the first optical member array is embedded in the columnar axial direction thereof, wherein the columnar axial direction of the columnar optical members is inclined by α° with respect to the direction in which the light emitting components are arrayed in the semiconductor laser element, and the material of which the columnar optical members are made has a refractive index that is different from that of the transparent material of the second optical member.

10. The optical lens according to claim 1, wherein the curved surface of the first optical action component is a convex curved surface, and the material of which the columnar optical members are made has a refractive index that is higher than that of the transparent material of the second optical member.

11. The optical lens according to claim 1, wherein the curved surface of the first optical action component is a concave curved surface, and the material of which the columnar optical members are made has a refractive index that is lower than that of the transparent material of the second optical member.

12. The optical lens according to claim 1, wherein the columnar axial direction of the columnar optical members is inclined by 45° with respect to the direction in which the light emitting components are arrayed in the semiconductor laser element.

13. An optical lens, comprising:
the optical lens according to claim 1; and
a parallel optical lens that is disposed along with the above-mentioned optical lens and includes a third optical action component that acts in the Y-axial direction on the light emitted from the light emitting components.

14. The optical lens according to claim 1, wherein said optical lens is made by drawing.

15. An optical system, comprising:
a light emitting element comprising an array of a plurality of light emitting components;
the optical lens according to claim 1, which acts on the light emitted from the light emitting element; and
a light receiver comprising one or an array or a plurality of light receiving components that receive the light emitted from the optical lens.

16. An optical lens, which acts on the light emitted from a semiconductor laser element comprising an array of a plurality of light emitting components, and then emits the light, comprising:
two first optical members each having a plurality of columnar optical portions including first optical action components in the side surface of the columnar optical portion that have a curved surface on either the incident light side or the emitted light side and that act on the light emitted from the light emitting components, the columnar optical portions being disposed in parallel and in the same plane; and
a second optical member that is columnar in shape and made of a transparent material, and inside of which the two first optical members are embedded in parallel in the columnar axial direction thereof,
wherein the columnar axial direction of the columnar optical portions is inclined by α° with respect to the direction in which the light emitting components are arrayed in the semiconductor laser element,
the material of which the first optical members are made has a refractive index that is different from that of the transparent material of the second optical member, and
each of the first optical members has two end portions both of which are exposed from the second optical member.

17. An optical lens comprising:
two first optical member arrays each having a plurality of columnar optical members including first optical action components in the side surface of the columnar optical member that have a curved surface that acts on the incident light, the columnar optical members being disposed along a predetermined direction and the extending directions of which being disposed in parallel each other; and
a second optical member that is made of a transparent material, and inside of which the two first optical member arrays are embedded in parallel,
wherein the extending direction of the columnar optical members is inclined by α° with respect to the predetermined direction along which a plurality of the columnar optical members are disposed,
the material of which the columnar optical members are made has a refractive index that is different from that of the transparent material of the second optical member, and
each of the columnar optical members has two end portions both of which are exposed from the second optical member.

18. An optical lens comprising:
two first optical members each having a plurality of columnar optical portions including first optical action components in the side surface of the columnar optical portion that have a curved surface that acts on the incident light, the columnar optical portions being disposed along a predetermined direction and the extending directions of which being disposed in parallel each other; and
a second optical member that is made of a transparent material, and inside of which the two first optical members are embedded in parallel,
wherein the extending direction of the columnar optical portions is inclined by α° with respect to the predetermined direction along which a plurality of the columnar optical portions are disposed,
the material of which the first optical members are made has a refractive index that is different from that of the transparent material of the second optical member, and
each of the first optical members has two end portions both of which are exposed from the second optical member.

19. An optical lens, which acts on the light emitted from a semiconductor laser element comprising an array of a plurality of light emitting components, and then emits the light, comprising:
a first optical member having a plurality of columnar optical portions each including two first optical action components which have curved surfaces and are provided on both the incident light side and the emitted light side in the side of the first optical portion and that act on the light emitted from the light emitting components, the columnar optical portions being disposed in parallel and in the same plane; and
a second optical member that is columnar in shape and made of a transparent material, and inside of which the first optical member is embedded in parallel in the columnar axial direction thereof,
wherein the columnar axial direction of the columnar optical portions is inclined by α° with respect to the direction in which the light emitting components are arrayed in the semiconductor laser element,
the material of which the first optical member is made has a refractive index that is different from that of the transparent material of the second optical member, and the first optical member has two end portions both of which are exposed from the second optical member.

20. An optical lens, which acts on the light emitted from a semiconductor laser element comprising an array of a plurality of light emitting components, and then emits the light, comprising:

a first optical member having a plurality of columnar optical portions each including two first optical action components which have curved surfaces and are opposed in the side surface of the first optical portion and which act on the incident light, the columnar optical portions being disposed along a predetermined direction and the extending directions of which being disposed in parallel each other; and a second optical member that is made of a transparent material, and inside of which the first optical member is embedded in parallel, wherein the extending direction of the columnar optical portions is inclined by $\alpha°$ with respect to the predetermined direction along which a plurality of the columnar optical portions are disposed, the material of which the first optical member is made has a refractive index that is different from that of the transparent material of the second optical member, and the first optical member has two end portions both of which are exposed from the second optical member.

* * * * *